United States Patent
Jung et al.

(10) Patent No.: US 10,475,553 B2
(45) Date of Patent: Nov. 12, 2019

(54) SUBMARINE CABLE HAVING HETEROGENEOUS ARMOR

(71) Applicant: LS CABLE & SYSTEM LTD., Anyang-si, Gyeonggi-do (KR)

(72) Inventors: Soon Chul Jung, Uijeongbu-si (KR); Seon Tae Kim, Seoul (KR); Kum Hwan Cha, Anyang-si (KR); Jee Yong Park, Seongnam-si (KR); Kyoung Soo Kim, Bucheon-si (KR); Doo Yeon Kim, Suwon-si (KR); Seung Chol Lee, Gunpo-si (KR); Ji Young Kim, Seoul (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/764,199

(22) PCT Filed: Sep. 19, 2016

(86) PCT No.: PCT/KR2016/010421
§ 371 (c)(1),
(2) Date: Mar. 28, 2018

(87) PCT Pub. No.: WO2017/057863
PCT Pub. Date: Apr. 6, 2017

(65) Prior Publication Data
US 2019/0057794 A1 Feb. 21, 2019

(30) Foreign Application Priority Data

Sep. 30, 2015 (KR) .................. 10-2015-0137347
Sep. 30, 2015 (KR) .................. 10-2015-0137349

(Continued)

(51) Int. Cl.
*H01B 9/00* (2006.01)
*H01B 7/28* (2006.01)
(Continued)

(52) U.S. Cl.
CPC .............. *H01B 7/2806* (2013.01); *H01B 1/02* (2013.01); *H01B 7/0208* (2013.01); *H01B 7/14* (2013.01);
(Continued)

(58) Field of Classification Search
CPC .................................. H01B 9/025; H01B 7/18
(Continued)

(56) References Cited

U.S. PATENT DOCUMENTS 3,134,843 A * 5/1964 Monelli ................ G01P 15/135
174/88 R
3,925,598 A * 12/1975 Suzuki ..................... H01B 7/14
174/108

(Continued)

FOREIGN PATENT DOCUMENTS

CN 202134240 U 2/2012
EP 0136877 4/1985
(Continued)

OTHER PUBLICATIONS

Korean Office Action for related Korean Application No. 10-2016-0039953; action dated Oct. 22, 2018; (7 pages).
(Continued)

*Primary Examiner* — Chau N Nguyen
(74) *Attorney, Agent, or Firm* — K&L Gates LLP (57) ABSTRACT

The present invention relates to a submarine cable having a bimetallic armor. In particular, the present invention relates to a submarine cable capable of effectively suppressing damage to and corrosion of an armor formed of different types of metals due to a local decrease in tensile strength (Continued)

thereof and capable of avoiding an increase in an external diameter of the cable, the structural instability of the cable, and damage to the cable during the manufacture and installation thereof.

14 Claims, 8 Drawing Sheets

(30) Foreign Application Priority Data

| | | |
|---|---|---|
| Sep. 30, 2015 | (KR) | 10-2015-0137353 |
| Apr. 1, 2016 | (KR) | 10-2016-0039953 |
| Apr. 1, 2016 | (KR) | 10-2016-0039958 |
| Apr. 1, 2016 | (KR) | 10-2016-0039967 |
| Apr. 1, 2016 | (KR) | 10-2016-0040054 |
| Sep. 7, 2016 | (KR) | 10-2016-0114973 |

(51) Int. Cl.
　　*H01B 1/02* (2006.01)
　　*H01B 7/02* (2006.01)
　　*H01B 7/14* (2006.01)
　　*H01B 7/282* (2006.01)
　　*H01B 9/02* (2006.01)
　　*H02G 9/02* (2006.01)
　　*H01B 7/22* (2006.01)

(52) U.S. Cl.
　　CPC ............. *H01B 7/2825* (2013.01); *H01B 9/02* (2013.01); *H02G 9/02* (2013.01); *H01B 7/226* (2013.01); *H01B 9/027* (2013.01)

(58) Field of Classification Search
　　USPC .......................................... 174/102 R, 88 R
　　See application file for complete search history.

(56) References Cited

U.S. PATENT DOCUMENTS

| | | | | |
|---|---|---|---|---|
| 5,047,594 | A * | 9/1991 | Powell | H01R 4/70 136/232 |
| 6,481,082 | B1 * | 11/2002 | Widney | E21B 17/00 29/407.01 |
| 8,413,723 | B2 * | 4/2013 | Varkey | E21B 17/206 166/339 |
| 8,686,290 | B2 * | 4/2014 | Orini | H01B 7/14 174/102 R |
| 2012/0024565 | A1 | 2/2012 | Orini | |

FOREIGN PATENT DOCUMENTS

| | | |
|---|---|---|
| EP | 1191546 A1 | 3/2002 |
| JP | 58-096882 A | 6/1983 |
| JP | 58-179279 A | 10/1983 |
| JP | 2000021251 A | 1/2000 |
| JP | 2013-004411 A | 1/2013 |
| JP | 2013-044423 A | 3/2013 |
| JP | 2015-093283 A | 5/2015 |
| KR | 1020110102296 | 9/2011 |
| WO | 2014202356 A1 | 12/2014 |

OTHER PUBLICATIONS

International Search Report for related International Application No. PCT/KR2016/010421; report dated Jan. 10, 2017; (3 pages).
Written Opinion for related International Application No. PCT/KR2016/010421; report dated Jan. 10, 2017; (3 pages).
Supplemental European Search Report for related European Application No. 16852010.4; action dated Jul. 23, 2019; (10 pages).

* cited by examiner

SUBMARINE CABLE HAVING HETEROGENEOUS ARMOR

CROSS-REFERENCE TO RELATED APPLICATIONS

The present application is a National Stage of International Application No. PCT/KR2016/010421, filed Sep. 19, 2016, which claims priority to Korean Application No. 10-2015-0137347, filed Sep. 30, 2015, Korean Application No. 10-2015-0137349, filed Sep. 30, 2015, Korean Application No. 10-2015-0137353, filed Sep. 30, 2015, Korean Application No. 10-2016-0039953, filed Apr. 1, 2016, Korean Application No. 10-2016-0039958, filed Apr. 1, 2016, Korean Application No. 10-2016-0039967, filed Apr. 1, 2016, Korean Application No. 10-2016-0040054, filed Apr. 1, 2016, and Korean Application No. 10-2016-0114973, filed on Sep. 7, 2016 the disclosures of which are incorporated herein by reference.

TECHNICAL FIELD

The present invention relates to a submarine cable having a bimetallic armor. In particular, the present invention relates to a submarine cable capable of effectively suppressing damage to and corrosion of an armor formed of different types of metals due to a local decrease in tensile strength thereof and capable of avoiding an increase in an external diameter of the cable, the structural instability of the cable, and damage to the cable during the manufacture and installation thereof.

BACKGROUND ART

Figure 1A:
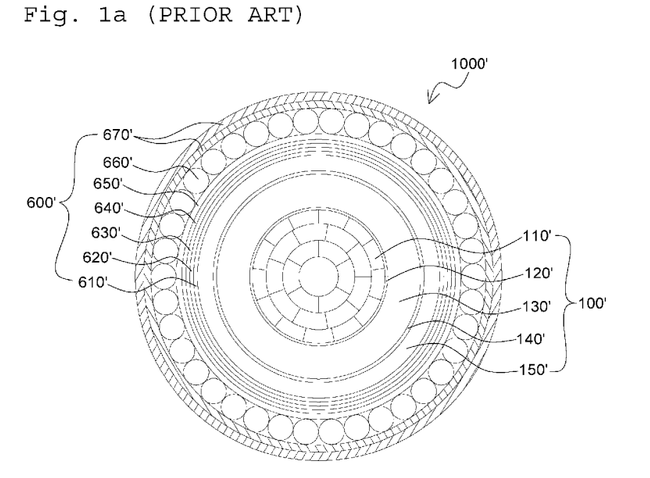
FIGS. 1A and 1B are schematic cross-sectional views of submarine cables according to the related art.
Figure 1B:
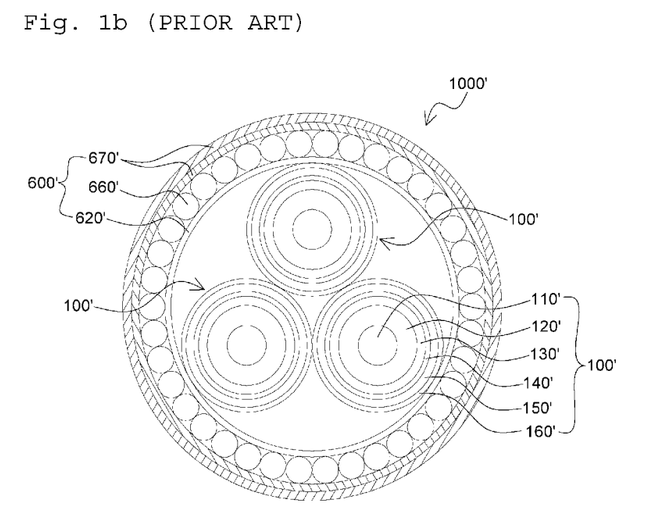

A submarine cable is a cable installed at a bottom of a sea to transmit power between two points, e.g., between continents or between a land and an island, which are separated from each other while having a sea therebetween. FIGS. 1A and 1B are schematic cross-sectional views of submarine cables.

Generally, as illustrated in FIG. 1A, a submarine cable 1000' may include a cable core 100' having a conductor 110', an inner semiconductive layer 120' covering the conductor 110', an insulating layer 130' covering the inner semiconductive layer 120', an outer semiconductive layer 140' covering the insulating layer 130', and a metal sheath layer 150' covering the outer semiconductive layer 140'; and a cable protective layer 600' covering the cable core 100', etc. The cable protective layer 600' may include, for example, an inner sheath 610', a metal reinforcing layer 630', bedding layers 620' and 640' provided on and below the metal reinforcing layer 630', an outer sheath 650', an armor 660', and an outer serving layer 670', etc.

Alternatively, as illustrated in FIG. 1B, a submarine cable 1000' may include a plurality of cable cores 100' and a cable protective layer 600' covering the cable cores 100'. Here, each of the cable cores 100' may include a conductor 110', an inner semiconductive layer 120' covering the conductor 110', an insulating layer 130' covering the inner semiconductive layer 120', an outer semiconductive layer 140' covering the insulating layer 130', a metal sheath layer 150' covering the outer semiconductive layer 140', and a sheath 160' covering the metal sheath layer 150'.

Since the submarine cable 1000' is installed at a bottom of a sea, it is likely to be damaged by an anchor or fishing gear of a ship in a region in which a fishery activity is active or is likely to be damaged due to a natural phenomenon, such as strong sea breeze caused by ocean current or waves, or when chafed by a seabed. Generally, to prevent this problem, the submarine cable 1000' includes the armor 660' formed of a metal wire.

The armor 660' is a structural reinforcing part which reinforces mechanical features and performance of the submarine cable 1000' and provides resistance against external damage thereto during the handling and installation of the submarine cable 1000'. Generally, the armor 660' may be formed of middle/low carbon containing steel, galvanized steel, copper, brass, bronze, or the like, and may be formed by horizontally winding wires each having a round or flat cross section.

Generally, the submarine cable 1000' is installed in the water but a section thereof is buried into a different environment, e.g., land such as a seaside, an adjacent inland site, or an edge of a canal. An ambient temperature of the land is higher than a temperature in the water. Thus, a rated current of the submarine cable 1000' representing current transfer capability is determined by the section of the submarine cable 1000' buried in the land.

That is, magnetic domains in wires formed of a ferromagnetic material having high magnetic permeability such as middle/low carbon containing steel and constituting the armor 660' are rotated due to a change in a magnetic field generated from current flowing through the conductor 100'. The rated current of the submarine cable 1000' is additionally limited due to an increase in a temperature thereof, caused by magnetic hysteresis loss due to the rotation of the magnetic domains. A problem due to the increase in the temperature caused by the magnetic hysteresis loss is more serious at the section of the submarine cable 1000' buried in the land of a higher ambient temperature than at the section of the submarine cable 1000' installed at the bottom of the sea and cooled by seawater. Therefore, the rated current of the submarine cable 1000' is limited by not only the section of the submarine cable 1000' buried in the land but also eddy currents induced due to a conductive material of the armor 660' and causing energy loss in the form of heat.

Thus, in a submarine cable according to the related art, wires forming a portion of an armor included in a first section installed in the water are general steel wires, and wires forming a portion of the armor included in a second section buried in the land are non-ferromagnetic metal wires substantially having no ferromagnetic property, e.g., stainless steel wires, to minimize magnetic hysteresis loss and a temperature change due to the magnetic hysteresis loss, thereby minimizing a limitation in the rated current of the cable.

However, in the submarine cable according to the related art, butt-welded parts may be particularly vulnerable to a tensile force applied to the submarine cable according to the related art and portions of the armors near the butt-welded parts may be damaged when the steel wires and the stainless steel wires forming the portions of the armor are coupled to each other at a border between the first and second sections by butt welding or the like.

Furthermore, in the submarine cable according to the related art, if the steel wires and the stainless steel wires forming the portions of the armor are coupled to each other at the border between the first section and the second section by butt welding or the like, bimetallic corrosion, i.e., galvanic corrosion, may occur and thus the armor may be damaged when the butt-welded parts and contact surfaces between the steel wires and the stainless steel wires are exposed to seawater which is an electrolyte.

As disclosed in U.S. Pat. No. 8,686,290, in the submarine cable according to the related art, a galvanic anode such as a zinc rod is bonded onto the butt-welded parts of the steel wires and the stainless steel wires in a lengthwise direction of the wires to suppress the galvanic corrosion. However, an external diameter of the cable is locally increased and the structure of the cable is unstable due to the galvanic anode protruding from the wires. Furthermore, a surface of the cable becomes irregular and thus the cable is likely to be damaged during the manufacture of the cable or when the cable passes through an installation path.

Accordingly, there is an urgent demand for a submarine cable capable of effectively suppressing damage to and corrosion of an armor formed of different types of metals due to a local decrease in tensile strength thereof, and capable of avoiding an increase in an external diameter of the cable, structural instability of the cable, and damage to the cable during the manufacture and installation of the cable.

DETAILED DESCRIPTION OF THE INVENTION

Technical Problem

The present invention is directed to a submarine cable capable of effectively suppressing damage to an armor formed of different types of metals due to a local decrease in tensile strength thereof.

The present invention is also directed to a submarine cable capable of effectively suppressing corrosion of an armor formed of different types of metals.

The present invention is also directed to a submarine cable capable of avoiding an increase in an external diameter of the cable, structural instability of the cable, and damage to the cable during the manufacture and installation thereof, regardless of the addition of a means for suppressing corrosion of an armor formed of different types of metals to the cable.

Technical Solution

According to an aspect of the present invention, there is provided a submarine cable which includes at least one cable core and a cable protective layer covering the at least one cable core, the submarine cable comprising: a first section of which at least a portion is installed at a bottom of a sea; and a second section of which at least a portion is installed in land, wherein each of the at least one cable core comprises a conductor, an inner semiconductive layer covering the conductor, an insulating layer covering the inner semiconductive layer, an outer semiconductive layer covering the insulating layer and a metal sheath layer covering the outer semiconductive layer, wherein the cable protective layer comprises an armor, and the armor comprises a plurality of metal wires spirally covering the at least one cable core, wherein each of the metal wires is formed by connecting a first metal wire included in the armor disposed in the first section and a second metal wire included in the armor disposed in the second section, wherein the first metal wire is formed of a first metal material, and the second metal wire is formed of a second metal material which is different from the first metal material, and wherein the cable protective layer comprises an electrolyte blocking film configured to protect a connection part of the first metal wire and the second metal wire from an electrolyte.

According to another aspect of the present invention, there is provided the submarine cable of claim 1, wherein the first metal wire is plated with a third metal material having a lower self-potential than that of the first metal material.

According to other aspect of the present invention, there is provided The submarine cable of claim 1, wherein a number of electrolyte blocking films arranged on a cross section of the submarine cable is equal to or less than a maximum number $N_t$ of electrolyte blocking film defined by Equation 1 below, $$N_t = \text{Int}[\{(D_a+D_c) \times \pi - (\text{Int}((D_a+D_c) \times \pi \times S \div D_a) \times D_a)\} \div (t \times 2)], \quad \text{[Equation 1]}$$

wherein $D_a$ represents a diameter of the metal wires, $D_c$ represents an external diameter of an inside of the armor of the submarine cable, and S represents a space factor defined by Equation 2 below, and $$\text{space factor } S = \{(\text{diameter of metal wires} \times \text{number of metal wires}) / \text{length of circumference connecting centers of metal wires}\}, \quad \text{[Equation 2]}$$

wherein t represents a thickness of the electrolyte blocking film.

According to other aspect of the present invention, there is provided the submarine cable of claim 1, wherein the electrolyte blocking film comprises a shrinkable tube.

According to other aspect of the present invention, there is provided the submarine cable of claim 1, wherein connection parts of the metal wires are coated with a rust inhibitor.

According to other aspect of the present invention, there is provided the submarine cable of claim 1, wherein a surface of the first metal wire, a surface of the second metal wire, or surfaces of both the first and second metal wires are coated with polymer resin.

According to other aspect of the present invention, there is provided the submarine cable of claim 1, wherein the armor comprises at least one galvanic anode wire arranged in parallel to the metal wires, and formed of a fourth metal material having a lower self-potential than those of the first metal material and the second metal material.

According to other aspect of the present invention, there is provided a submarine cable which includes at least one cable core and a cable protective layer covering the at least one cable core, the submarine cable comprising: a first section of which at least a portion is installed at a bottom of a sea; and a second section of which at least a portion is installed in land, wherein each of the at least one cable core comprises a conductor, an inner semiconductive layer covering the conductor, an insulating layer covering the inner semiconductive layer, an outer semiconductive layer covering the insulating layer and a metal sheath layer covering the outer semiconductive layer, wherein the cable protective layer comprises an armor, and the armor comprises a plurality of metal wires spirally covering the at least one cable core, wherein each of the metal wires is formed by connecting a first metal wire included in the armor disposed in the first section and a second metal wire included in the armor disposed in the second section, wherein the first metal wire is formed of a first metal material, and the second metal wire is formed of a second metal material which is different from the first metal material, and wherein a surface of the first metal wire, a surface of the second metal wire, or surfaces of both the first and second metal wires are coated with polymer resin.

According to other aspect of the present invention, there is provided a submarine cable which includes at least one cable core and a cable protective layer covering the at least one cable core, the submarine cable comprising: a first section of which at least a portion is installed at a bottom of a sea; and a second section of which at least a portion is installed in land, wherein each of the at least one cable core comprises a conductor, an inner semiconductive layer covering the conductor, an insulating layer covering the inner semiconductive layer, an outer semiconductive layer covering the insulating layer and a metal sheath layer covering the outer semiconductive layer, wherein the cable protective layer comprises an armor, and the armor comprises a plurality of metal wires spirally covering the at least one cable core, wherein each of the metal wires is formed by connecting a first metal wire included in the armor disposed in the first section and a second metal wire included in the armor disposed in the second section, wherein the first metal wire is formed of a first metal material, and the second metal wire is formed of a second metal material which is different from the first metal material, and wherein the armor comprises at least one galvanic anode wire arranged in parallel to the metal wire, and formed of a fourth metal material having a lower self-potential than those of the first metal material and the second metal material.

According to other aspect of the present invention, there is provided the submarine cable of claim 9, wherein the first metal wire is plated with a third metal material having a lower self-potential than that of the first metal material.

According to other aspect of the present invention, there is provided the submarine cable of claim 10, wherein the self-potential of the third metal material is equal to or less than that of the fourth metal material.

According to other aspect of the present invention, there is provided the submarine cable of claim 9, wherein the first metal material comprises steel.

According to other aspect of the present invention, there is provided the submarine cable of claim 12, wherein the second metal material comprises a non-ferromagnetic metal.

According to other aspect of the present invention, there is provided the submarine cable of claim 13, wherein the second metal material comprises stainless steel.

According to other aspect of the present invention, there is provided the submarine cable of claim 11, wherein the fourth metal material comprises aluminum, zinc, magnesium, or an alloy thereof.

According to other aspect of the present invention, there is provided the submarine cable of claim 11, wherein the fourth metal material comprises zinc, and the third metal material comprises zinc or magnesium.

According to other aspect of the present invention, there is provided the submarine cable of claim 9, wherein a surface of the first metal wire, a surface of the second metal wire, or surfaces of both the first and second metal wires are coated with polymer resin.

According to other aspect of the present invention, there is provided a submarine cable which includes at least one cable core and a cable protective layer covering the at least one cable core, the submarine cable comprising: a first section of which at least a portion is installed at a bottom of a sea; and a second section of which at least a portion is installed in land, wherein each of the at least one cable core comprises a conductor, an inner semiconductive layer covering the conductor, an insulating layer covering the inner semiconductive layer, an outer semiconductive layer covering the insulating layer and a metal sheath layer covering the outer semiconductive layer, wherein the cable protective layer comprises an armor, and the armor comprises a plurality of metal wires spirally covering the at least one cable core, wherein each of the metal wires is formed by connecting a first metal wire included in the armor disposed in the first section and a second metal wire included in the armor disposed in the second section, wherein the first metal wire is formed of a first metal material, and the second metal wire is formed of a second metal material which is different from the first metal material, and wherein a number of connection parts of the first and second metal wires per unit length of 1 m of the submarine cable is n/8 or less, and wherein n represents a total number of the metal wires included in the armor.

According to other aspect of the present invention, there is provided the submarine cable of claim 18, wherein a number of connection parts of the first and second metal wires per unit length of 1 m of the submarine cable is six or less.

According to other aspect of the present invention, there is provided the submarine cable of claim 18, wherein a horizontal distance between the connection parts of respective adjacent metal wires among the metal wires is 0.3 m or more.

According to other aspect of the present invention, there is provided the submarine cable of claim 18, wherein the connection parts are formed by butt-welding the first and second metal wires.

Advantageous Effects

A submarine cable according to the present invention is capable of precisely controlling a distribution of connection parts between bimetallic metals of an armor formed of different types of metals so as to effectively suppress a local decrease in tensile strength of an armor formed of different types of metals and damage to the armor due to the local decrease in the tensile strength thereof.

Furthermore, the submarine cable according to the present invention is capable of effectively suppressing corrosion of metal wires of the armor, and avoiding an unnecessary increase in an external diameter of the cable and damage to the cable during the manufacture and installation of the cable.

BEST MODE

Hereinafter, exemplary embodiments of the present invention will be described in detail. However, the present invention is not limited thereto and may be embodied in many different forms. Rather, the embodiments set forth herein are provided so that this disclosure will be thorough and complete and will fully convey the concept of the invention to those of ordinary skill in the art. As used herein, the same reference numerals represent the same elements.

Figure 2A:
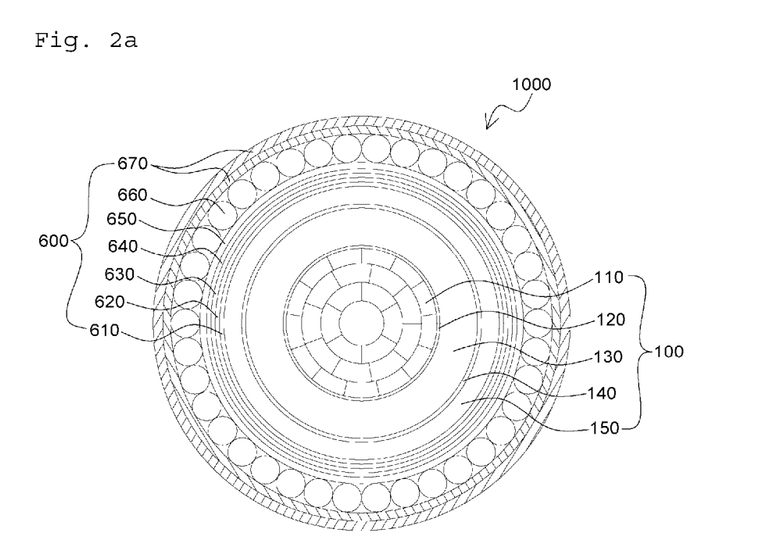
FIGS. 2A and 2B are schematic cross-sectional views of submarine cables according to the present invention.
Figure 2B:
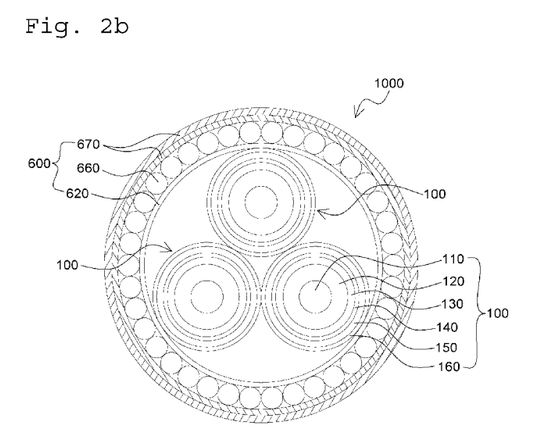

FIGS. 2A and 2B are schematic cross-sectional views of submarine cables according to the present invention.

A submarine cable 1000 according to the present invention may include at least one cable core 100 having at least one conductor 110 serving as a current moving path for transmitting electric current and formed of high-purity copper (Cu), aluminum (Al), or the like having high conductivity, appropriate hardness, and flexibility, and particularly, annealed copper wires having a high elongation rate and high conductivity to minimize power loss, an inner semiconductive layer 120 configured to the conductor 110, suppress a non-uniform charge distribution on a surface of the conductor 110, relieve an electric field distribution from the inside of the cable 1000, and remove a gap between the conductor 110 and an insulating layer 130 which will be described below to suppress a partial discharge, dielectric breakdown, etc., an insulating layer 130 configured to cover the inner semiconductive layer 120 and formed of an insulating material such as polymer resin or insulating paper, an outer semiconductive layer 140 configured to cover the insulating layer 130, relieve an electric field distribution by suppressing a non-uniform charge distribution between the insulating layer 130 and a metal sheath layer 150 which will be described below, and physically protect the insulating layer 130 from the metal sheath layer 150 which may have various shapes, and the metal sheath layer 150 configured to cover the outer semiconductive layer 140 to equalize an electric field distribution inside the insulating layer 130, prevent an electric field from leaking to the outside of the cable 1000 to achieve an electric shielding effect, function as a return circuit for fault current by earthing one end of the cable 1000 when grounding or a short circuit accident occurs in the cable 1000 to secure security, protect the cable 1000 from an external shock, pressure, etc., and improve a waterproof property, a flame resistance property, etc. of the cable 1000; a cable protective layer 600 covering the cable core 100 and provided on an outer side of the cable 1000 to protect the cable 1000 from an external shock, pressure, etc.; and the like.

The submarine cable 1000 according to the present invention is applicable when one cable core 100 is provided as illustrated in FIG. 2A but also when a plurality of cable cores 100 are provided as illustrated in FIG. 2B. Each of the plurality of cable cores 100 may additionally include an inner sheath 160 covering the metal sheath layer 150.

Here, the cable protective layer 600 may include an inner sheath 610 and an outer sheath 650 configured to improve the corrosion resistance, the waterproof resistance, etc. of the cable 1000 and protect the cable 1000 from mechanical trauma, heat, fire, ultraviolet rays, insects, or animals, a metal reinforcing layer 630 configured to protect the cable 1000 from mechanical shocks, bedding layers 620 and 640 provided on and below the metal reinforcing layer 630, an armor 660 configured to additional protect the cable 1000 from sea currents or rocks at a bottom of a sea and formed of iron wires or the like, an outer serving layer 670, etc. However, a cable protective layer 600 covering the plurality of cable cores 100 as illustrated in FIG. 2B may not include the inner sheath 610, the metal reinforcing layer 630, etc. The cable protective layer 600 according to the present invention may be designed variously according to a design of a cable.

In particular, the armor 660 may be formed by horizontally winding a plurality of metal wires 661 each having a round or flat cross section and formed of a metal. The metal wires 661 may include iron wires formed of steel, stainless steel, etc. having high mechanical strength. Here, the metal wires 661 may have a diameter of about 3 to 8 mm.

Figure 3:
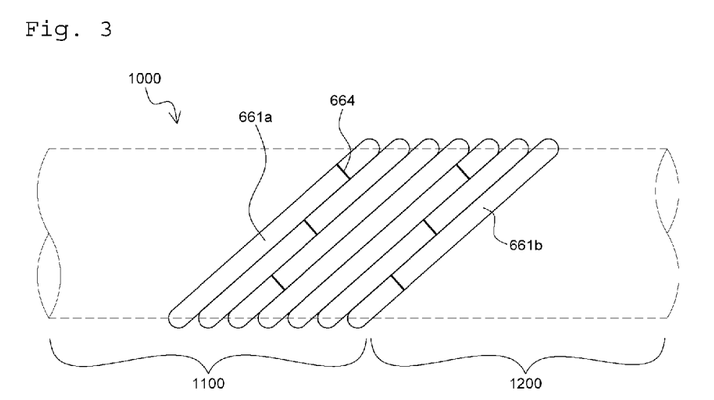
FIG. 3 is a diagram schematically a distribution of connection parts of an armor of a submarine cable according to an embodiment of the present invention.

FIG. 3 is a diagram schematically a distribution of connection parts of an armor of a submarine cable according to an embodiment of the present invention.

As illustrated in FIG. 3, in a submarine cable 1000 according to the present invention, an armor 660 may include a plurality of metal wires spirally covering one or more cable cores. The armor 660 may include first metal wires 661a of a portion of the armor 660 included in a first section 1100 of which at least a portion is installed at a bottom of a sea, and second metal wires 661b of a portion of the armor 660 included in a second section 1200 of which at least a portion is installed in land.

The first metal wires 661a may be formed of a first metal material, and preferably, steel which is cheap, is easy to obtain, and has a high mechanical property, whereas the second metal wires 661b may be formed of a second metal material which is different from the first metal material, and preferably, a non-ferromagnetic metal substantially having no ferromagnetic property, e.g., stainless steel.

More preferably, the first metal wires 661a may be plated with a third metal material, e.g., zinc, having a lower self-potential than that of the first metal material. The plating layer may make the first metal wires 661a be cathodic when exposed to an electrolyte such as seawater and thus be corroded in place of the first metal wires 661a, thereby suppressing corrosion of the first metal wires 661a.

The first section 1100 may use a cooling action of seawater, and thus, an increase in a rated current of the submarine cable 1000 representing current transfer capability by heat generated due to either magnetic hysteresis loss due to a change in a magnetic field generated from current flowing through the conductor 100 or energy loss in the form of heat, such as eddy currents, is not a serious problem. Accordingly, in the submarine cable 1000 according to the present invention, the armor 660 may be formed of steel wire which is relatively cheap in the first section 1100, thereby decreasing manufacturing costs of the submarine cable 1000.

In contrast, an ambient temperature of the second section 1200 is higher by about 10° C. or more than that at a bottom of a sea and thus generation of heat due to the magnetic hysteresis loss or energy loss in the form of heat such as eddy currents may be a serious problem. Thus, the rated current of the submarine cable 1000 representing current transfer capability may be decreased or an external diameter of the submarine cable 1000 may be unnecessarily increased. In the second section 1200 of the submarine cable 1000 according to the present invention, the armor 660 may be formed of a non-ferromagnetic metal substantially having no ferromagnetic property, e.g., stainless steel wire, to avoid or minimize the magnetic hysteresis loss, thereby suppressing a decrease in the rated current of the submarine cable 1000 and an unnecessary increase in the external diameter of the submarine cable 1000.

However, as illustrated in FIG. 3, the first metal wires 661*a* and the second metal wires 661*b* of the armor 600 in the first section 1100 and the second section 1200 are butt-welded at a border between the first section 1100 and the second section 1200 of the submarine cable 1000. Connection parts 664 of the first metal wires 661*a* and the second metal wire 661*b* by butt welding or the like may be more vulnerable to tensile strength than other portions of the first and second metal wires 661*a* and 661*b*. Thus, when the connection parts 664 are clustered, portions of the armor 600 near the clustered connection parts 664 are likely to be locally damaged with respect.

Thus, the inventors of the present application found that a local decrease in tensile strength of the armor 600 and local damage to the armor therefor were effectively suppressed when a number of the connection parts 664 of the first metal wires 661*a* and the second metal wires 661*b* per unit length of 1 m of the submarine cable 1000 according to the present invention was controlled to be n/8 or less (here, n represents a total number of the metal wires 661 of the armor 600) and a horizontal distance between the connection parts 664 of adjacent metal wires 661 was controlled to be 0.3 m or more, and completed the present invention.

In an embodiment of the present invention, when a submarine cable has a structure as illustrated in FIG. 2A, the total number of the metal wires 661 of the armor 660 may be 48, the number of connection parts 664 of the first metal wires 661*a* and the second metal wires 661*b* per unit length of 1 m of the submarine cable may be in a range of 0 to 6, a horizontal distance between a first connection part 664 and a last connection parts 664 may be 17 m, and a horizontal distance between connection parts 664 of adjacent metal wires 661 may be about 0.35 m.

When a submarine cable according to the present invention has a structure as illustrated in FIG. 2B, the total number of the metal wires 661 of the armor 660 may be 116, the number of connection parts 664 of the first metal wires 661*a* and the second metal wires 661*b* per unit length of 1 m of the submarine cable may be in a range of 0 to 6, a horizontal distance between a first connection part 664 and a last connection parts 664 may be 60 m, and a horizontal distance between connection parts 664 of adjacent metal wires 661 may be about 0.52 m.

As illustrated in FIGS. 4 to 10, a submarine cable according to the present invention may include at least one type of corrosion suppressing means selected from a group consisting of an electrolyte blocking film, a polymer coating, a galvanic anode wire, etc., as will be described below.

Figure 4:
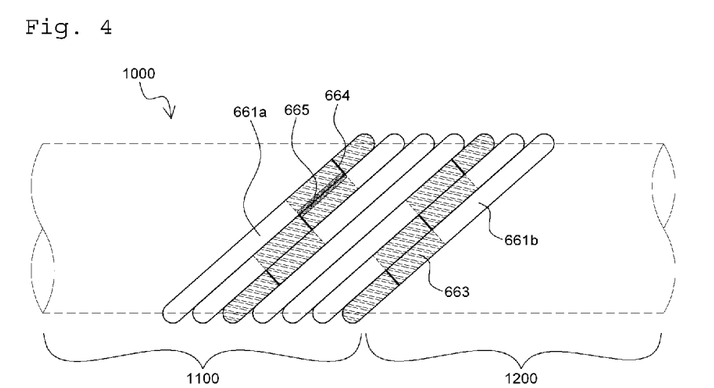
FIG. 4 is a diagram illustrating an electrolyte blocking film serving as a means for preventing corrosion of an armor of a submarine cable, according to an embodiment of the present invention.

FIG. 4 is a diagram illustrating an electrolyte blocking film serving as a means for preventing corrosion of an armor of a submarine cable, according to an embodiment of the present invention.

As illustrated in FIG. 4, in a submarine cable 1000 according to the present invention, an armor 660 may include a plurality of metal wires spirally covering one or more cable cores. The armor 660 may include first metal wires 661*a* of a portion of the armor 660 provided in a first section 1100 of which at least a portion is installed at a bottom of a sea, and second metal wires 661*b* of the armor 660 included in a second section 1200 of which at least a portion is installed in land.

The first metal wires 661*a* may be formed of a first metal material, and preferably, steel which is cheap, is easy to obtain, and has a high mechanical property, whereas the second metal wires 661*b* may be formed of a second metal material which is different from the first metal material, and preferably, a non-ferromagnetic metal substantially having no ferromagnetic property, e.g., stainless steel.

More preferably, the first metal wires 661*a* may be plated with a third metal material, e.g., zinc, having a lower self-potential than that of the first metal material thereof. The plating layer may make the first metal wires 661*a* be cathodic when exposed to an electrolyte such as seawater and thus be corroded in place of the first metal wires 661*a*, thereby suppressing corrosion of the first metal wires 661*a*.

The first section 1100 may use a cooling action of seawater, and thus, an increase in a rated current of the submarine cable 1000 representing current transfer capability by heat generated due to either magnetic hysteresis loss due to a change in a magnetic field generated from current flowing through the conductor 100 or energy loss in the form of heat, such as eddy currents, is not a serious problem. Accordingly, in the submarine cable 1000 according to the present invention, the armor 660 may be formed of steel wire which is relatively cheap in the first section 1100, thereby decreasing manufacturing costs of the submarine cable 1000.

In contrast, an ambient temperature of the second section 1200 is higher by about 10° C. or more than that at a bottom of a sea and thus generation of heat due to the magnetic hysteresis loss or energy loss in the form of heat such as eddy currents may be a serious problem. Thus, the rated current of the submarine cable 1000 representing current transfer capability may be decreased or an external diameter of the submarine cable 1000 may be unnecessarily increased. In the second section 1200 of the submarine cable 1000 according to the present invention, the armor 660 may be formed of a non-ferromagnetic metal substantially having no ferromagnetic property, e.g., stainless steel wire, to avoid or minimize the magnetic hysteresis loss, thereby suppressing a decrease in the rated current of the submarine cable 1000 and an unnecessary increase in the external diameter of the submarine cable 1000.

However, as illustrated in FIG. 4, the first metal wires 661*a* and the second metal wires 661*b* of the armor 600 in the first section 1100 and the second section 1200 are coupled to each other at a border between the first section 1100 and the second section 1200 of the submarine cable 1000 by butt welding or the like. Since the steel wires used as the first metal wires 661*a* and the stainless steel wires used as the second metal wires 661*b* are different types of metals, galvanic corrosion which is bimetallic corrosion may occur and thus the armor 660 may be damaged when a contact point 664 between the first metal wire 661*a* and the second metal wire 661*b* and a contact surface 665 between adjacent first and second metal wires 661*a* are exposed to an electrolyte such as seawater.

Accordingly, the submarine cable 1000 according to the present invention may further include electrolyte blocking films 663 configured to protect connection parts, e.g., the contact points 664, of the first metal wire 661*a* and the second metal wire 661*b* of the armor 660 from an electrolyte such as seawater, thereby suppressing galvanic corrosion which is bimetallic corrosion.

The electrolyte blocking film 663 may be, for example, a shrinkable tube, an aluminum tape, an adhesive, or the like. The electrolyte blocking film 663 hardly protrudes on the metal wires 661, unlike a galvanic anode protruding and bonded onto bonded portions of bimetallic wires according to the related art. Thus, the electrolyte blocking film 663 may further suppress an increase in an external diameter of the cable and the cable from being structurally instable and having irregular surfaces due to the protrusion of the galvanic anode according to the related art, thereby preventing the cable from being damaged during the manufacture thereof and when the cable passes through an installation path.

Here, when the electrolyte blocking film 663 has a thick thickness, the electrolyte blocking film 663 is difficult to be applied to a process of forming an armor and has a non-uniform external diameter. Thus, the electrolyte blocking film 663 is preferably formed to a thin thickness. Accordingly, the electrolyte blocking film 663 may be formed to a thickness of 0.01 to 2 mm. More preferably, the thickness of the electrolyte blocking film 663 is equal to or less than 15% of a thickness of the metal wires 661.

In the present invention, the connection parts of the first and second metal wires 661a and 661b may be coated with a rust inhibitor containing aluminum or zinc particles before the shrinkable tube 663 is formed. The metal particles having low self-potential of the rust inhibitor are electrically connected to the first and second metal wires 661a and 661b and make the metal wires 661 be cathodic, thereby performing cathodic protection to suppress corrosion of the metal wires 61. Thus, the rust inhibitor may perform an auxiliary role to prevent the corrosion of the metal wires 661.

Here, the rust inhibitor may contain metal particles of about 10 to 50% by weight of the total weight of the rust inhibitor and having lower self-potential than those of the first and second metal wires 661a and 661b. For example, the rust inhibitor may contain dimethyl ether of 30 to 40% by weight, toluene of 25 to 30% by weight, zine particles of 20 to 30% by weight, and epoxy resin of 15 to 20% by weight of the total weight of the rust inhibitor.

In particular, the shrinkable tube serving as the electrolyte blocking film 663 is a tube having a property of shrinking when heated, and may be formed by performing operations of FIG. 5(a) to (e). The connection parts of the first and second metal wires 661a and 661b may be air-tightly sealed by the shrinkable tube to block the permeation of an electrolyte such as seawater. When manufactured in the form of the shrinkable tube, the electrolyte blocking film 663 is easy to form and has a high sealing property and thus is most preferable in terms of long-term reliability.

Figure 5:
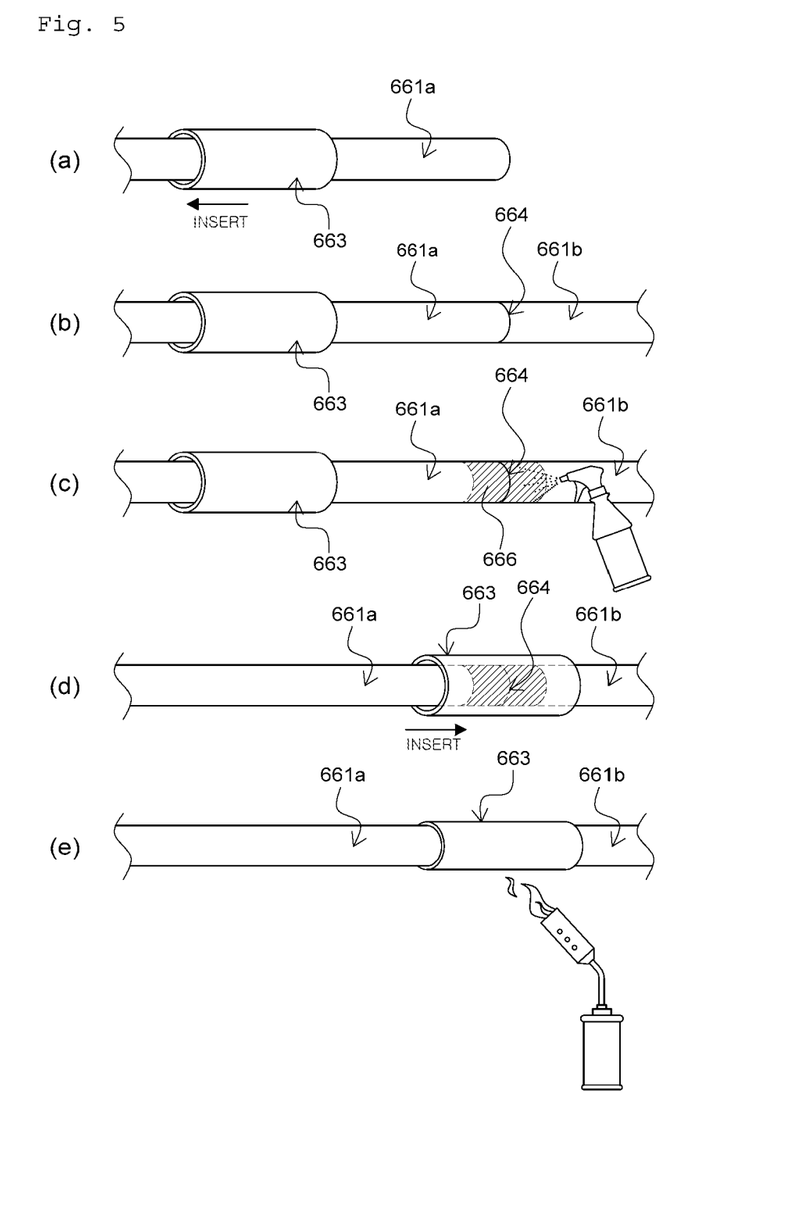
FIG. 5 is a diagram schematically illustrating a method of providing a shrinkable tube serving as an electrolyte blocking film of a submarine cable, according to an embodiment of the present invention.

A method of forming the shrinkable tube may include, for example, (a) inserting the shrinkable tube serving as the electrolyte blocking film 663 into an end portion of the first metal wire 661a, (b) coupling opposite end portions of the first and second metal wires 661a and 661b by butt welding or the like, (c) applying a rust inhibitor 666 around the connection parts 664 of the first and second metal wires 661a and 661b, (d) moving the shrinkable tube onto the connection parts 664, (e) heating the shrinkable tube to shrink, etc.

A type of the shrinkable tube is not particularly limited, and may be formed by, for example, a composition containing fluoro-based resin, silicon-based resin, polyolefin-based resin, ethylene-vinyl acetate-based copolymerized resin, polyester-based resin, or the like as basic resin, and additionally containing various functional additives such as a flame retardant, a stabilizer, an antioxidant, a crosslinking agent, a lubricant, an ultraviolet blocking agent, an antistatic agent, or a pigment if necessary.

The shrinkable tube may have an internal diameter of 8 to 12 mm when it does not shrink, and have an internal diameter of 2.4 to 3.6 mm when it shrinks completely. A change in a length thereof may be about −15% or less when it shrinks completely. A sealing property of the shrinkable tube may be additionally improved when an adhesive is additionally provided on an inner surface thereof.

The electrolyte blocking film 663 may be an aluminum layer formed by horizontally winding an aluminum tape. For example, a thin aluminum tape having a thickness of about 0.01 to 0.07 mm may be stacked in multiple layers on the connection parts 664 of the first and second metal wires 661a and 661b by horizontally winding the thin aluminum tape to obtain an aluminum tape layer having a thickness of 0.1 to 1 mm, thereby air-tightly sealing the connection parts 644 and blocking the permeation of an electrolyte such as seawater. The aluminum tape is advantageous in that the aluminum tape layer formed by horizontally winding the aluminum tape is thin and light.

Alternatively, the electrolyte blocking film 663 may be formed by applying an adhesive. For example, the adhesive may be epoxy glue for metal bonding, which has high adhesive strength of about 230 kg/cm$^2$ or more and a heat resistance property of 120° C. or more, and preferably has a thixotropic property of not flowing down when applied. The adhesive is easy to apply to a very thin thickness and thus the electrolyte blocking film 663 is easily formed using the adhesive.

Figure 6:
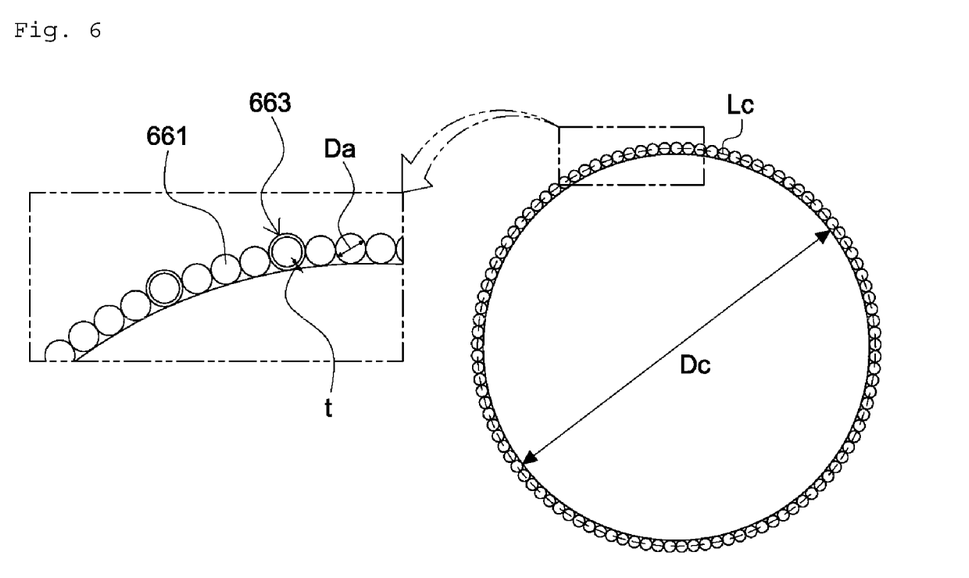
FIG. 6 is a diagram schematically illustrating an arrangement of metal wires and electrolyte blocking films to form an armor of a submarine cable according to the present invention.
Figure 7:
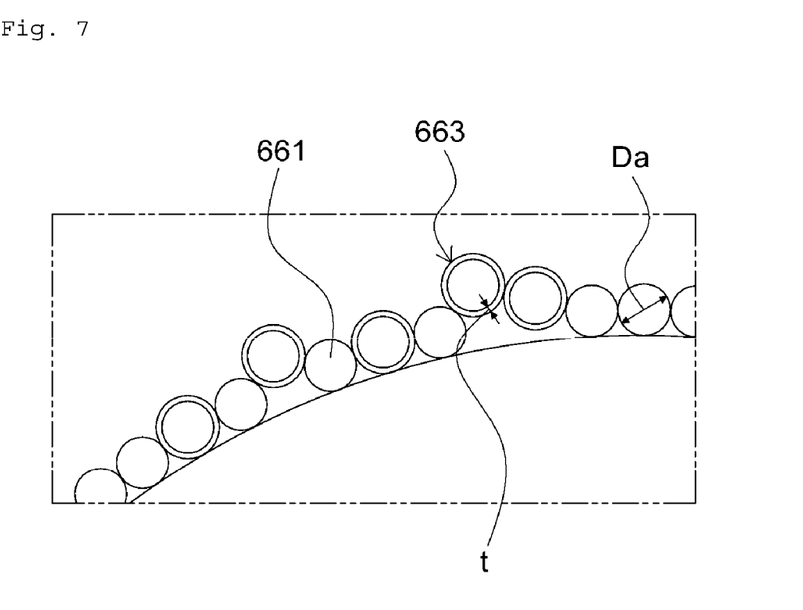
FIG. 7 is a diagram schematically illustrating an unstable structure of an armor when the number of electrolyte blocking films arranged on a cross section of a submarine cable is excessive, according to the present invention

FIG. 6 is a diagram schematically illustrating an arrangement of metal wires and electrolyte blocking films to form an armor on a cross section of a submarine cable according to the present invention. FIG. 7 is a diagram schematically illustrating an unstable structure of an armor when the number of electrolyte blocking films arranged on a cross section of a submarine cable is excessive, according to the present invention.

As illustrated in FIG. 7, when the number of electrolyte blocking films 663 arranged on metal wires 661 of an armor 660 on a cross section of the submarine cable according to the present invention is excessive, there is no free space between the metal wires 661 and thus the metal wires 661 may partially protrude outwards, thereby increasing an external diameter of the submarine cable or causing the submarine cable to have an unstable structure.

To solve this problem, according to the present invention, connection parts of a plurality of first metal wires 661a and a plurality of second metal wires 661b are formed to be dispersed in a lengthwise direction of the submarine cable. Thus, the number of electrolyte blocking films 663 corresponding to the number of metal wires 661 are also formed to be dispersed in the lengthwise direction of the cable, thereby preventing an excessive number of electrolyte blocking films 663 from being formed on a cross section of the submarine cable.

Thus, the number of electrolyte blocking films 663 arranged on a cross section of the submarine cable according to the present invention is preferably equal to or less than a maximum number $N_t$ of electrolyte blocking films defined by Equation 1 below. Accordingly, a local increase in an external diameter of the submarine cable according to the present invention or an unstable structure of the submarine cable due to an excessive number of electrolyte blocking films 663 may be suppressed.

$$N_t = \text{Int}[\{(D_a+D_c) \times \pi - (\text{Int}((D_a+D_c) \times \pi \times S \div D_a) \times D_a)\} \div (t \times 2)] \quad \text{[Equation 1]}$$

In Equation 1 above, $D_a$ represents a diameter of metal wires, $D_c$ represents an external diameter of the inside of an armor of a submarine cable, S represents a space factor, and t represents a thickness of an electrolyte blocking film.

Here, a function value Int(x) is an integer value of x, excluding digits after decimal points, and the space factor S represents a size of a free space between the metal wires 661. As the space factor S increases, the free space decreases. The space factor S may be defined by Equation 2 below, and may be 0.90 or more, e.g., in a range of 0.95 to 0.98.

$$\text{space factor } S = \{(\text{diameter of metal wires} \times \text{number of metal wires})/\text{length of circumference connecting centers of metal wires}\} \quad \text{[Equation 2]}$$

Here, the space factor S represents a ratio of the length of the metal wires 661 to a length $L_c$ of a circumference around which the metal wires 661 are arranged and which connects the centers of the metal wires 661, excluding gaps between the metal wires 661, when electrolyte blocking films are not taken into account. The space factor S is a designed value determined before the manufacture of the cable, and is generally determined to be in a range of 0.95 to 0.98. When the space factor S is extremely small, a size of a space having no metal wires 661 increases and the armor may malfunction. When the space factor S is extremely large, the cable may be difficult to manufacture.

A process of deriving Equation 1 above will be described in detail below.

If the length of the circumference around which the metal wires 661 are arranged, i.e., which connects the centers of the metal wires 661, is $L_c$, $L_c = (D_a + D_c) \times \pi$. If the length of the metal wires 661 is $L_a$, $L_a = L_c \times S$. Thus, the number $N_a$ of the arranged metal wires 661 = $\text{Int}(L_a/D_a)$.

Accordingly, a total gap $G_a$, i.e., the sum of the gaps between the metal wires 661 on the circumference around which the metal wires 661 are arranged, may be calculated by an equation of $G_a = L_c - (N_a \times D_a)$. Thus, the maximum number $N_t$ of electrolyte blocking films for the stable structure of the cable may be calculated by an equation of $N_t = \text{Int}(G_a/(t \times 2))$. Equation 1 above is derived when $N_t = \text{Int}(G_a/(t \times 2))$ is expressed in the form of a function.

If the number of electrolyte blocking films 663 formed on a cross section of the cable is greater than the maximum number $N_t$, the metal wires 661 are not arranged in place and bulge as illustrated in FIG. 7. Thus, an external diameter of the cable increases or the structure of the cable is unstable.

In the present invention, the above-described problem does not occur, since the connection parts of the first metal and second wires 661a and 661b on which the electrolyte blocking films 663 are formed are designed to be dispersed in a lengthwise direction of the cable.

Here, the diameter $D_a$ of the metal wires 661 may be 3 to 8 mm, the external diameter $D_c$ of the inside of the armor of the submarine cable may be 80 to 300 mm, and the thickness t of the electrolyte blocking films 663 may be 0.5 to 2 mm when the electrolyte blocking films 663 are shrinkable tubes.

As illustrate in FIG. 6, the connection parts of the first and second metal wires 661a and 661b of adjacent metal wires 661 of the armor 660 may be arranged at different locations in the lengthwise direction of the cable. Thus, there may be a contact surface 665 between the first metal wire 661a of one of metal wires 661 arranged adjacent to each other in parallel, and the second metal wire 661b of the other metal wire 661 and thus bimetallic corrosion may occur at the contact surface 665.

Thus, the electrolyte blocking films 663 are preferably long to cover the contact surface 665 between side surfaces of the first and second metal wires 661a and 661b of the metal wires 661 arranged adjacent to each other in parallel, thereby suppressing the first and second metal wires 661a and 661b from being in contact with each other, and may have, for example, a length of 300 to 500 mm.

When the electrolyte blocking films 663 formed on the metal wires 661 arranged adjacent to each other in parallel are excessively long and thus overlap each other, an external diameter of the cable in overlapping regions of the electrolyte blocking films 663 may locally increase or the structure of the armor may be unstable.

Accordingly, in order to prevent the electrolyte blocking films 663 formed on the metal wires 661 arranged adjacent to each other in parallel from overlapping each other in the lengthwise direction of the cable, the length of the electrolyte blocking films 663 may be controlled to be equal to or less than a shorter horizontal distance among horizontal distances between the connection parts of the first and second metal wires 661a and the 661b of the metal wire 661 into which the electrolyte blocking films 663 are inserted and the connection parts of the first and second metal wires 661a and the 661b of other metal wires 661 adjacent to the metal wire 661 in a vertical direction.

When the length of the electrolyte blocking films 663 is controlled to be equal to or less than the shorter horizontal distance as described above, there may be a contact surface 665 between the first metal wire 661a of one of the adjacent metal wires 661 and the second metal wire 661b of the other metal wire 661 and thus bimetallic corrosion may occur at the contact surface 665. In this case, bimetallic corrosion may be prevented from occurring at the contact surface 665 by coating surfaces of the metal wires 661 with polymer resin, as will be described below.

Figure 8:
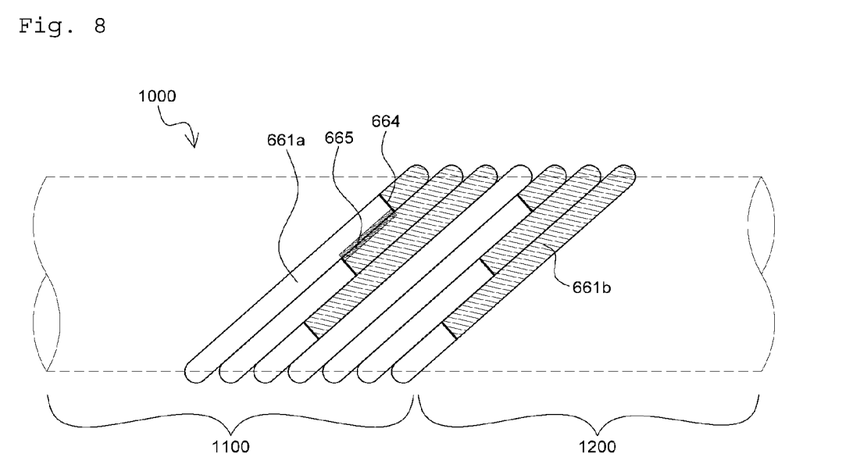
FIG. 8 is a diagram illustrating a polymer coating serving as a means for preventing corrosion of an armor of a submarine cable according to an embodiment of the present invention.

FIG. 8 is a diagram illustrating a polymer coating serving as a means for preventing corrosion of an armor of a submarine cable according to an embodiment of the present invention.

As illustrated in FIG. 8, in a submarine cable according to the present invention, a surface of one of the first metal wire 661a and the second metal wire 661b of the metal wire 661 or surfaces of both the first and second metal wires 661a and 661b may be coated with polymer resin. The polymer resin may include resin such as polyamide, polyethylene, or polypropylene. Here, the surface of the second metal wire 661b is preferably coated with the polymer resin, since the second metal wire 661b included in a second section of the submarine cable of which at least a portion is installed in land is shorter than the first metal wire 661a included in a first section of the submarine cable of which at least a portion is installed at a bottom of a sea. The polymer resin formed as described above prevents a contact surface from being formed between side surfaces of the first and second metal wires 661a and 661b of metal wires 661 arranged adjacent to each other in parallel, thereby suppressing bimetallic corrosion.

When the polymer resin is polyamide resin, in order to achieve properties, e.g., a thixotropic property, strength, a elongation rate, elasticity, etc., required for a metal wire coating purpose of the armor, the polyamide resin may have a density of about 1.4 to 1.6 g/cc, tensile strength of about 62 to 150 MPa, an elongation rate of about 2 to 20%, and a modulus of elasticity of about 3.0 to 5.5 GPa.

The polyethylene resin may have a density of about 0.9 to 1.3 g/cc, tensile strength of about 13 to 200 MPa, an elongation rate of about 3 to 2200%, and a modulus of elasticity of about 0.6 to 1.3 GPa. The polypropylene resin may have a density of about 0.9 to 1.8 g/cc, tensile strength of about 14 to 460 MPa, an elongation rate of about 8 to 750%, and a modulus of elasticity of about 0.7 to 3.6 GPa.

In the submarine cable according to the present invention, surfaces of the metal wires 661 of the armor 660 are coated with the polymer resin to prevent a contact surface from occurring between the side surfaces of the first and second metal wires 661a and 661b of the metal wires 661 arranged adjacent to each other in parallel, thereby suppressing bimetallic corrosion.

Figure 9:
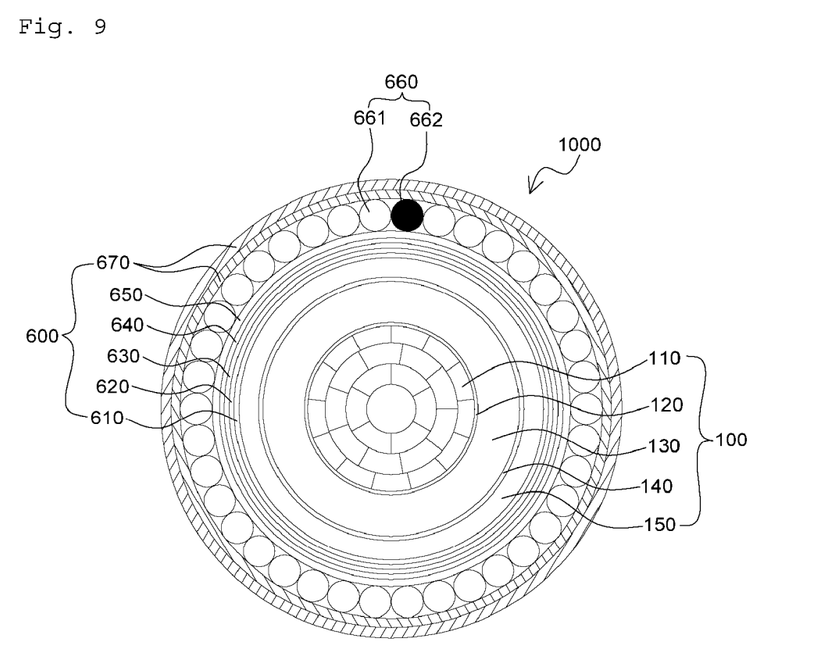
FIGS. 9 and 10 are diagrams illustrating galvanic anode wires serving as a means for preventing corrosion of an armor of a submarine cable according to an embodiment of the present invention.
Figure 10:
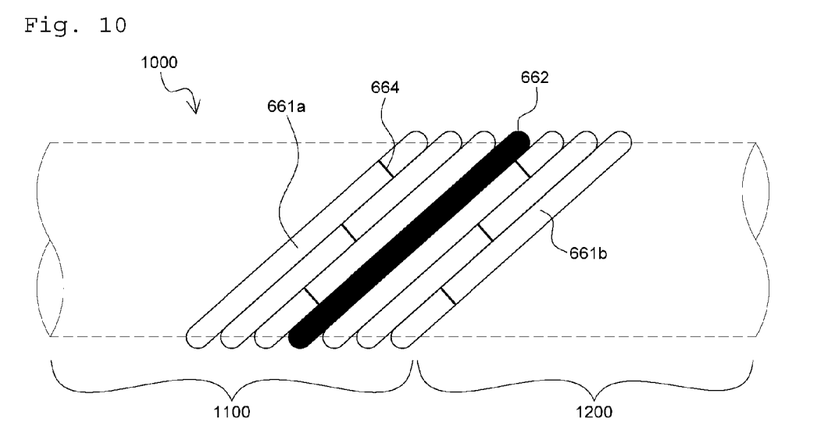

FIGS. 9 and 10 are diagrams illustrating galvanic anode wires serving as a means for preventing corrosion of an armor of a submarine cable according to an embodiment of the present invention.

As illustrated in FIGS. 9 and 10, the submarine cable according to the present invention may include one or more galvanic anode wires 662 to corrode in place of first and second metal wires 661a and 661b of an armor 660, thereby avoiding or suppressing damage to the armor 660 due to galvanic corrosion.

The galvanic anode wire 662 has substantially the same cross section shape, diameter, and cross-sectional area as the metal wire 661 and is arranged in parallel to the metal wire 661, unlike a conventional galvanic anode protruding from and bonded onto connection parts of bimetallic wires. Thus, problems that an external diameter of a cable increases and the cable has an irregular surface due to the protrusion of the conventional galvanic anode and thus the cable may be damaged during the manufacture of the cable and when the cable passes through an installation path can be suppressed.

A fourth metal material of the galvanic anode wire 662 may have a self-potential which is lower than those of the first metal material of the first metal wire 661a and a second metal material of the second metal wire 661b of the armor 660, and which is greater than or equal to that of the third metal material of the plating layer of the first metal wire 661a.

In an embodiment of the present invention, steel of −0.46 to 0.65 V is used as the first metal material, and stainless steel of −0.28 V is used as the second metal material. Thus, the fourth metal material may be aluminum, zinc, magnesium, or an alloy thereof. In particular, when the fourth metal material of the galvanic anode wire 662 is zinc (Zn) having self-potential of −1.07 V, the third metal material of the plating layer may be zinc (Zn) or magnesium (Mg) having a lower self-potential than that of zinc (Zn), i.e., magnesium (Mg) having a self-potential of −1.6 V.

Thus, the galvanic anode wire 662 is electrically connected to the metal wire 661 of the armor 660 and thus makes the metal wire 661 be cathodic, thereby performing cathodic protection to suppress corrosion of the metal wire 661. Furthermore, the plating layer earlier corrodes than the galvanic anode wire 662 and the galvanic anode wire 662 may serve as an armor during the corrosion of the plating layer.

A total weight of the galvanic anode wires 662 included in the armor 660 of the submarine cable according to the present invention may be designed in consideration of a desired lifetime of the cable, a galvanic anode consumption rate, current generated from a galvanic anode, etc.

A minimum number of galvanic anode wires 662 needed may be calculated by dividing a total minimum mass of the galvanic anode wires 662 by amass of one of the galvanic anode wires 662 according to a designed external diameter of the galvanic anode wire 662. The submarine according to the present invention shows an effect of effectively suppressing corrosion of the armor 660 during the lifetime of the submarine cable, owing to the design thereof.

Figure 11:
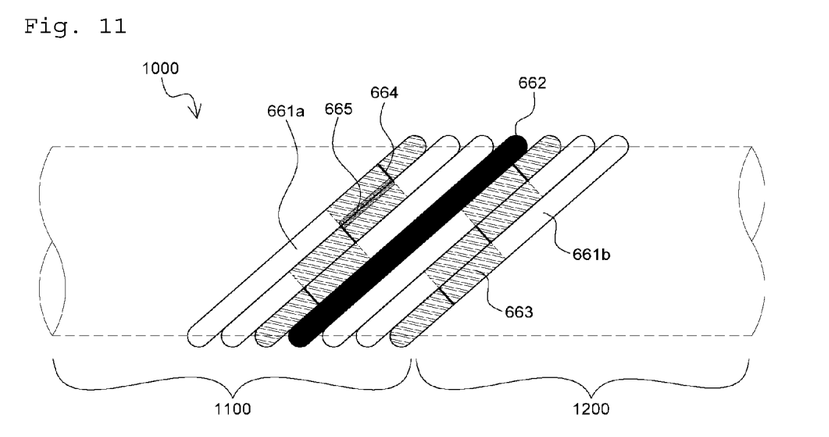
FIGS. 11 to 13 illustrate combinations of anti-corrosion means illustrated in FIGS. 4 to 10.
Figure 12:
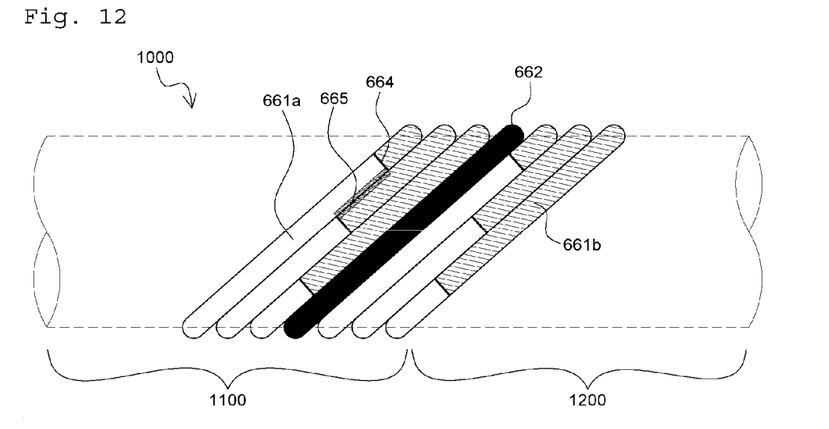
Figure 13:
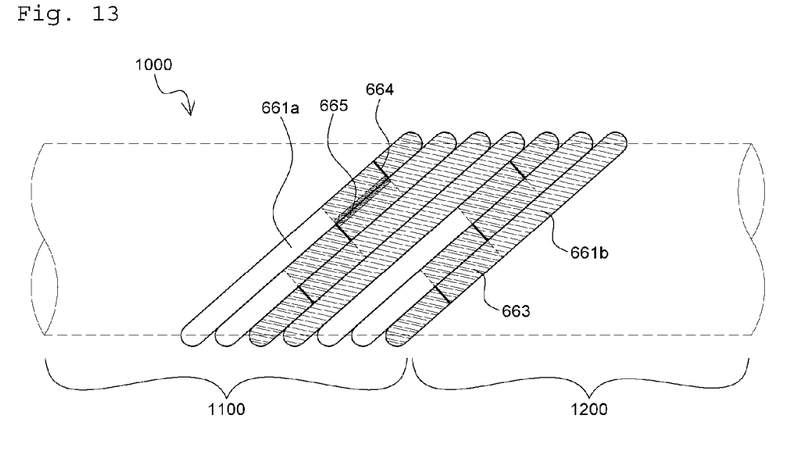

FIGS. 11 to 13 illustrate combinations of the anti-corrosion means illustrated in FIGS. 4 to 10.

As illustrated in FIG. 11, in a submarine cable according to the present invention, bimetallic corrosion, i.e., galvanic corrosion, may be suppressed from occurring at a contact point 664 and a contact surface 665 between a first metal wire 661a and a second metal wire 661b due to an electrolyte blocking film 663, and a galvanic anode wire 662 may be additionally provided to corrode in place of the armor 660 to suppress the armor 660 from being damaged due to corrosion which may occur.

Alternatively, as illustrated in FIG. 12, in a submarine cable according to the present invention, a non-ferromagnetic metal wire 661b is coated with polymer resin to suppress bimetallic corrosion, i.e., galvanic corrosion, from occurring at a contact surface 665 between a first metal wire 661a and a second metal wire 661b, and a galvanic anode wire 662 may be additionally provided to corrode in place of the armor 660 to suppress the armor 660 from being damaged by corrosion which may occur.

Alternatively, as illustrated in FIG. 13, in a submarine cable according to the present invention, bimetallic corrosion, i.e., galvanic corrosion, may be suppressed from occurring at a contact point 664 and a contact surface 665 between a first metal wire 661a and a second metal wire 661b due to an electrolyte blocking film 663, and the second metal wire 661b may be coated with polymer resin in case the contact surface 665 is not completely covered with the electrolyte blocking film 663.

While the present invention has been described above with respect to exemplary embodiments thereof, it would be understood by those skilled in the art that various changes and modifications may be made without departing from the technical conception and scope of the present invention. Thus, it is clear that all modifications are included in the technical scope of the present invention as long as they include the components as claimed in the claims of the present invention.

The invention claimed is:

1. A submarine cable which includes at least one cable core and a cable protective layer covering the at least one cable core, the submarine cable comprising:
   a first section of which at least a portion is installed at a bottom of a sea; and
   a second section of which at least a portion is installed in land,
   wherein each of the at least one cable core comprises a conductor, an inner semiconductive layer covering the conductor, an insulating layer covering the inner semiconductive layer, an outer semiconductive layer covering the insulating layer and a metal sheath layer covering the outer semiconductive layer,
   wherein the cable protective layer comprises an armor, and the armor comprises a plurality of metal wires spirally covering the at least one cable core,
   wherein each of the metal wires is formed by connecting a first metal wire included in the armor disposed in the first section and a second metal wire included in the armor disposed in the second section,
   wherein the first metal wire is formed of a first metal material, and the second metal wire is formed of a second metal material which is different from the first metal material,
   wherein the cable protective layer comprises a plurality of electrolyte blocking films configured to protect each connection part of the first metal wire and the second metal wire from an electrolyte, and wherein the connection parts of the first metal wires and the second metal wires are formed to be dispersed in a lengthwise direction of the submarine cable, wherein a number of the plurality of electrolyte blocking films arranged on a cross section of the submarine cable is equal to or less than a maximum number Nt of electrolyte blocking films defined by Equation 1 below, $$Nt=\text{Int}[\{(Da+Dc)\times\pi-(\text{Int}((Da+Dc)\times\pi\times S\div Da)\times Da)\}\div(t\times 2)], \quad \text{[Equation 1]}$$

wherein Da represents a diameter of the metal wires, Dc represents an external diameter of an inside of the armor of the submarine cable, and S represents a space factor defined by Equation 2 below, and $$\text{space factor } S=\{(\text{diameter of metal wires}\times\text{number of metal wires})/\text{length of circumference connecting centers of metal wires}\}, \quad \text{[Equation 2]}$$

wherein t represents a thickness of the electrolyte blocking films.

2. The submarine cable of claim 1, wherein the first metal wire is plated with a third metal material having a lower self-potential than that of the first metal material.

3. The submarine cable of claim 2, wherein the armor comprises at least one galvanic anode wire arranged in parallel to the metal wires, and formed of a fourth metal material having a lower self-potential than those of the first metal material and the second metal material.

4. The submarine cable of claim 1, wherein the electrolyte blocking films comprise a shrinkable tube.

5. The submarine cable of claim 1, wherein the connection parts of the first metal wires and the second metal wires are coated with a rust inhibitor.

6. The submarine cable of claim 1, wherein a surface of the first metal wire, a surface of the second metal wire, or surfaces of both the first and second metal wires are coated with polymer resin.

7. A submarine cable which includes at least one cable core and a cable protective layer covering the at least one cable core, the submarine cable comprising:

a first section of which at least a portion is installed at a bottom of a sea; and a second section of which at least a portion is installed in land, wherein each of the at least one cable core comprises a conductor, an inner semiconductive layer covering the conductor, an insulating layer covering the inner semiconductive layer, an outer semiconductive layer covering the insulating layer and a metal sheath layer covering the outer semiconductive layer, wherein the cable protective layer comprises an armor, and the armor comprises a plurality of metal wires spirally covering the at least one cable core, wherein the plurality of metal wires are arranged adjacent to each other in parallel, wherein each of the metal wires is formed by connecting a first metal wire included in the armor disposed in the first section and a second metal wire included in the armor disposed in the second section, wherein the first metal wire is formed of a first metal material, and the second metal wire is formed of a second metal material which is different from the first metal material, wherein the connection parts of the first metal wires and the second metal wires are formed to be dispersed in a lengthwise direction of the submarine cable, and thereby there is a contact surface between the first metal wire of one of the metal wires and the second metal wire of another one of the metal wires, and wherein a surface of the first metal wire, a surface of the second metal wire, or surfaces of both the first and second metal wires are coated with polymer resin.

8. A submarine cable which includes at least one cable core and a cable protective layer covering the at least one cable core, the submarine cable comprising:

a first section of which at least a portion is installed at a bottom of a sea; and a second section of which at least a portion is installed in land, wherein each of the at least one cable core comprises a conductor, an inner semiconductive layer covering the conductor, an insulating layer covering the inner semiconductive layer, an outer semiconductive layer covering the insulating layer and a metal sheath layer covering the outer semiconductive layer, wherein the cable protective layer comprises an armor, and the armor comprises a plurality of metal wires spirally covering the at least one cable core, wherein the plurality of metal wires are arranged adjacent to each other in parallel, wherein each of the metal wires is formed by connecting a first metal wire included in the armor disposed in the first section and a second metal wire included in the armor disposed in the second section, wherein the first metal wire is formed of a first metal material, and the second metal wire is formed of a second metal material which is different from the first metal material, wherein the connection parts of the first metal wires and the second metal wires are formed to be dispersed in a lengthwise direction of the submarine cable, and thereby there is a contact surface between the first metal wire of one of metal wires and the second metal wire of another one of the metal wires, wherein the armor comprises at least one galvanic anode wire arranged in parallel to the metal wires, and formed of a fourth metal material having a lower self-potential than those of the first metal material and the second metal material, and wherein the first metal wire is plated with a third metal material having a lower self-potential than that of the first metal material, and the self-potential of the third metal material is equal to or less than that of the fourth metal material.

9. The submarine cable of claim 8, wherein the first metal material comprises steel.

10. The submarine cable of claim 9, wherein the second metal material comprises a non-ferromagnetic metal.

11. The submarine cable of claim 10, wherein the second metal material comprises stainless steel.

12. The submarine cable of claim 8, wherein the fourth metal material comprises aluminum, zinc, magnesium, or an alloy thereof.

13. The submarine cable of claim 8, wherein the fourth metal material comprises zinc, and the third metal material comprises zinc or magnesium.

14. The submarine cable of claim 8, wherein a surface of the first metal wire, a surface of the second metal wire, or surfaces of both the first and second metal wires are coated with polymer resin.

* * * * *